Jan. 7, 1930.
J. J. HAWXHURST
LIQUID DELIVERY CONTROL
Re. 17,558
Original Filed Jan. 31, 1927
3 Sheets-Sheet 1
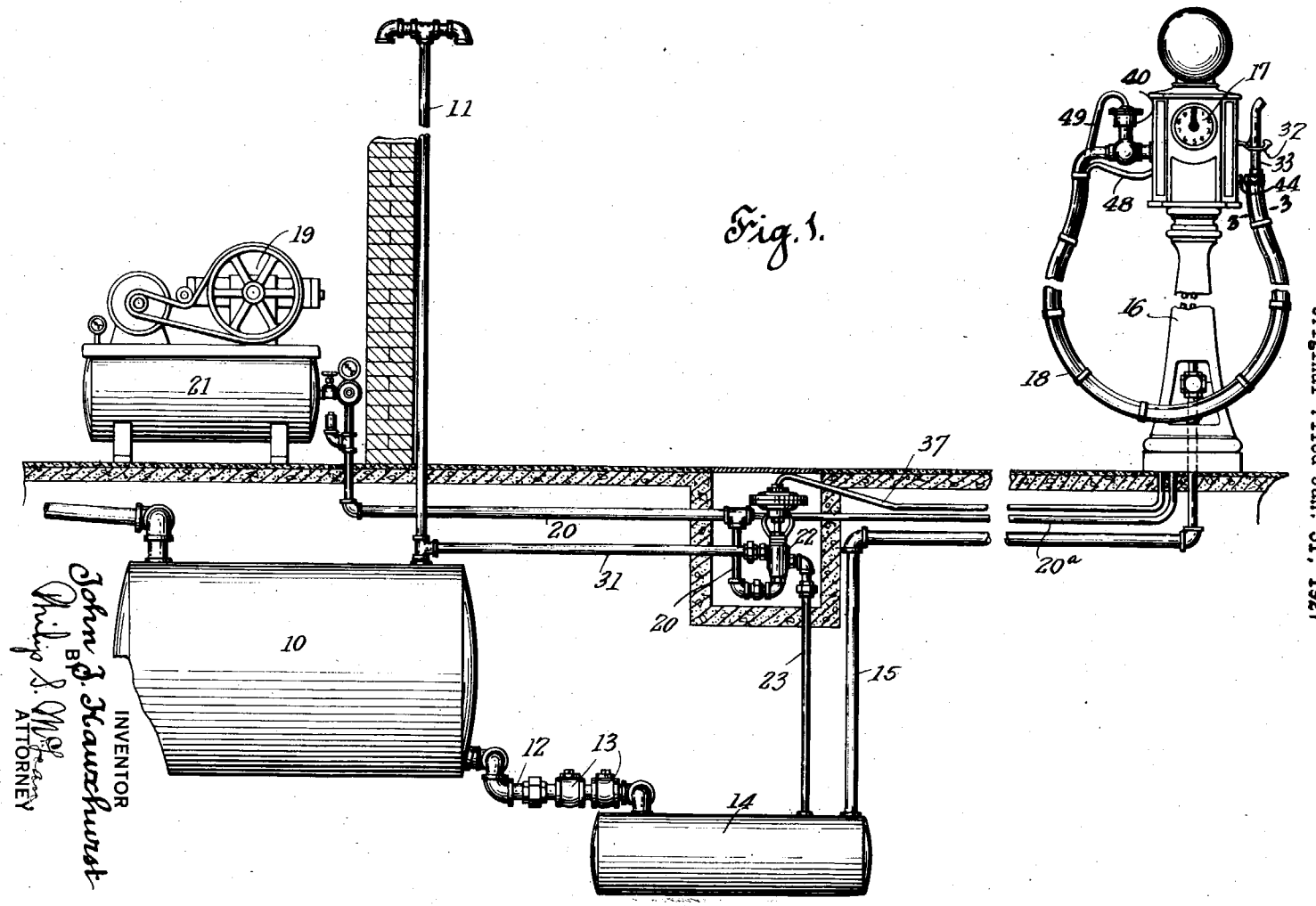

Jan. 7, 1930. J. J. HAWXHURST Re. 17,558
LIQUID DELIVERY CONTROL
Original Filed Jan. 31, 1927 3 Sheets-Sheet 2
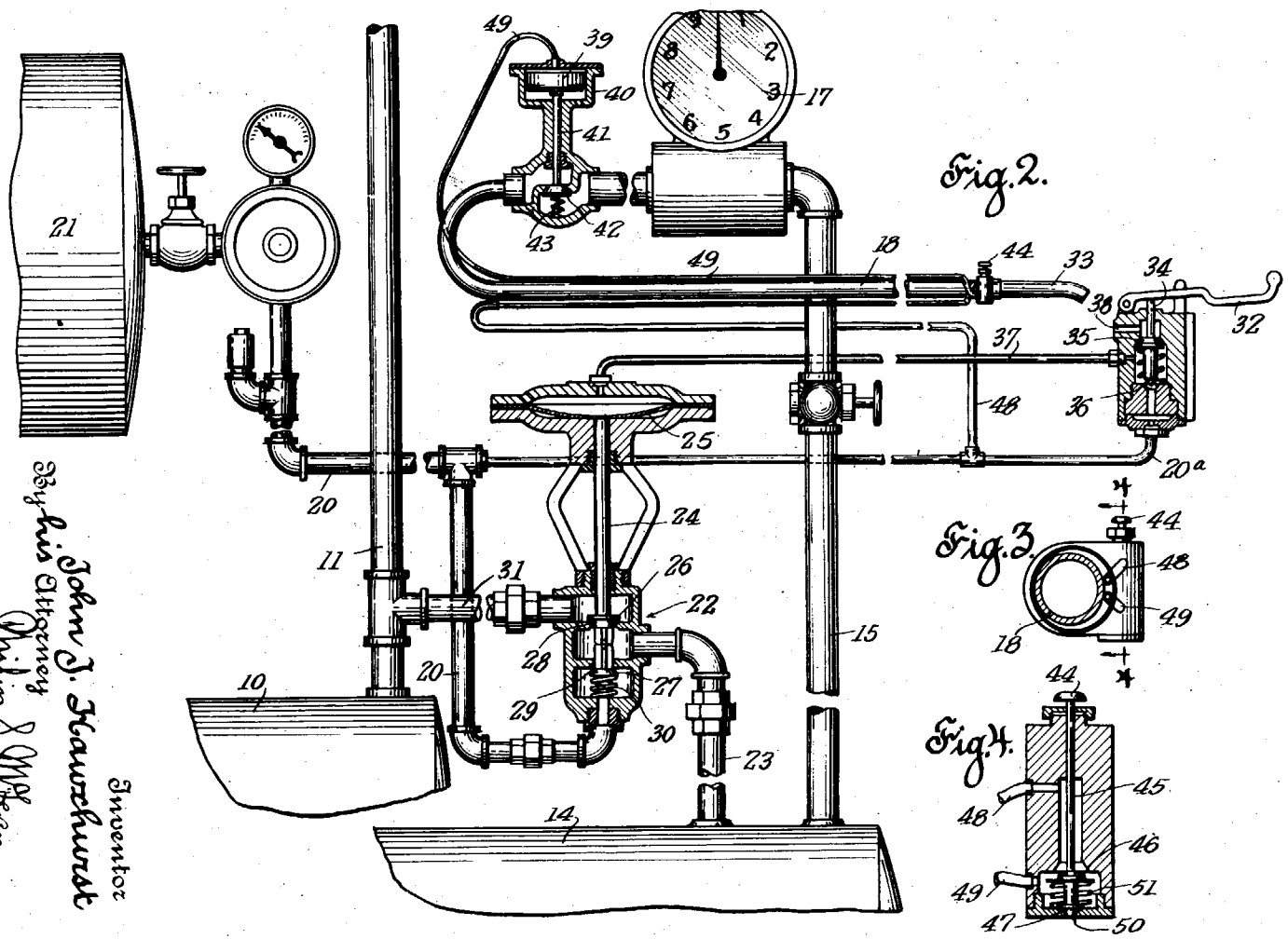
Inventor
John J. Hawxhurst
By his Attorney
Philip S. McLean.

Jan. 7, 1930. J. J. HAWXHURST Re. 17,558

LIQUID DELIVERY CONTROL

Original Filed Jan. 31, 1927 3 Sheets-Sheet 3

Inventor
John J. Hawxhurst
By his Attorney
Philip S. McLean

Reissued Jan. 7, 1930 Re. 17,558

UNITED STATES PATENT OFFICE

JOHN J. HAWXHURST, OF BROOKLYN, NEW YORK, ASSIGNOR, BY DIRECT AND MESNE ASSIGNMENTS, TO LIQUID DISPENSING SYSTEMS, INC., OF BROOKLYN, NEW YORK, A CORPORATION OF NEW YORK

LIQUID-DELIVERY CONTROL

Original No. 1,647,043, dated October 25, 1927, Serial No. 164,779, filed January 31, 1927. Application for reissue filed October 23, 1929. Serial No. 401,940.

This invention relates particularly to the dispensing of inflammable or otherwise dangerous liquids such as gasoline and the like.

Special objects of the invention are to enable the flow being controlled at the point of delivery, to automatically shut off flow in case of accident to the delivery pipes or hose and to provide for a so-called "dry hose" in the non-delivery condition of the apparatus.

The foregoing and other desirable objects are attained in this invention by certain novel features of construction, combinations and relations of parts as hereinafter set forth and broadly claimed.

The drawings accompanying and forming part of this specification illustrate the invention as embodied in certain practical commercial forms, but it is to be understood that the structure and arrangement may vary all within the scope of the appended claims.

Figure 1 is an illustrative embodiment of a pressure delivery system embodying features of the invention, the parts appearing in elevation and certain of them broken away for a lack of space or greater clearness.

Figure 2 is an enlarged broken detail and part sectional view illustrating particularly the various control devices and connections.

Figure 3 is an enlarged cross sectional view of the final delivery line or hose showing the nozzle control valve, this view being taken as on line 3—3 of Figure 1.

Figure 4 is an enlarged vertical sectional view of the control valve on the nozzle, the same being taken as on the line 4—4 of Figure 3.

Figures 5, 6, 7:
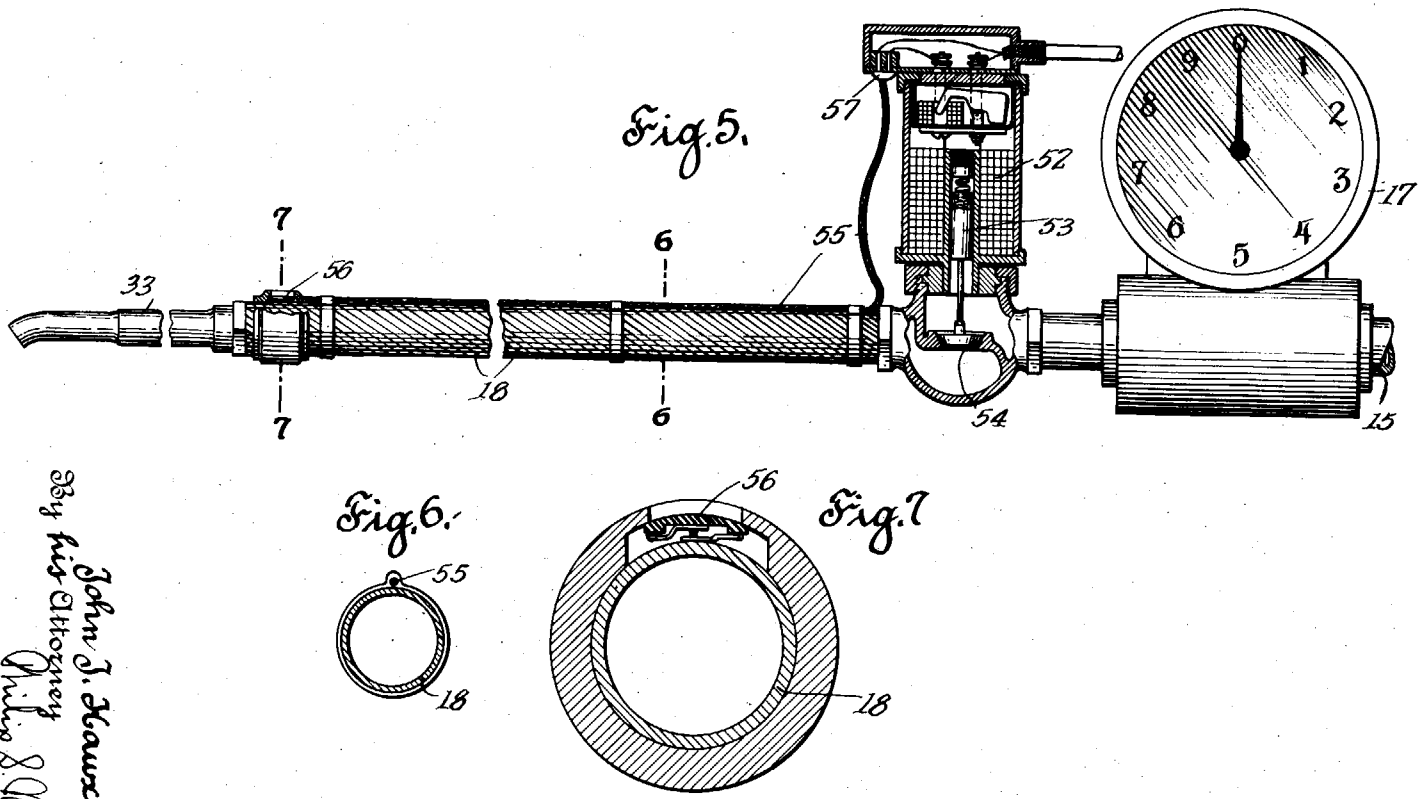
Figure 5 is a broken part sectional view of an electromagnetic form of delivery control.

Figures 6 and 7 are cross-sectional views on different scales as on lines 6—6 and 7—7 of Figure 5.

In the system disclosed in Figures 1 and 2, the liquid, gasoline for instance, is stored in a tank 10 vented by a line 11. From a low point in this tank the liquid is carried by a connection 12 through check valves 13 into a smaller pressure tank 14 of predetermined capacity. From this pressure tank, the liquid passes through a delivery line 15 to a delivery stand 16 and is measured by a flow meter 17, as dispensed through a delivery hose 18.

The actual delivery is effected through the power of compressed air supplied by a compressor 19. The connections for this purpose comprises an air line 20 extending from the compressor tank 21 to a pressure controlled valve 22 which is connected by an air line 23 with the top of the pressure tank 14.

The control valve 22 is shown in Figure 2 as comprising a valve stem 24 acted on by a piston or diaphragm 25 and connected at its lower end with the reversely facing valves 26, 27 to cooperate respectively with the exhaust port 28 and the pressure supply port 29. The latter port is open to the pressure line 20 so that when pressure is on the diaphragm and valve 27 is held open, such pressure will flow past valve 27 and out through the connection 23 into the pressure tank. At such a time valve 28 will be closed but when pressure on the diaphragm is released and the spring 30 thrusts the valve stem upwardly, valve 26 will be opened, permitting pressure in the tank to be exhausted by way of exhaust connection 31 to the vent line 11. It will be seen too that in this reverse position, the pressure supply valve 27 will be seated to prevent loss of pressure from the compressor while the gravity supplied tank 14 is being vented and hence is filling with liquid from the main storage tank.

The control valve is automatically governed, in the disclosure, by what is here termed a "telephone hook" control involving a pivoted hook 32 for supporting the delivery nozzle 33, said hook engaging a spring pressed plunger 34 carrying a vent valve 35 and a pressure supply valve 36, the latter permitting flow of compressed air from the air line 20 out through the line 37 to the diaphragm or piston 35 and the vent valve 35 controlling exhaust back through the line 37 and out the exhaust port 38.

In the position illustrated in Figure 2 where the nozzle is removed from the hook, the supply valve is open and the vent valve closed so that pressure is admitted to the diaphragm 25 of the control valve to put pressure on the liquid in tank 14. In this pressure admission position of the telephone hook valve, the vent valve 35 is closed; therefore, when the nozzle is removed from its support, it will be seen that the control valve will be automatically actuated to admit pressure to the pressure tank and that at such times liquid will be delivered from the pressure tank to the meter, ready for delivery through the hose or final delivery line. When the nozzle is restored to its hook, the supply valve 36 will be closed and the vent valve 35 will be opened to exhaust pressure from the diaphragm of the control valve, which latter will then close off the pressure on the liquid in the pressure tank and vent said tank so that it may again flow by gravity from the storage tank.

In systems of this type, as heretofore operated, the liquid under pressure, under the telephone hook control, has been admitted to the delivery hose and controlled at the point of discharge by what is known as a nozzle valve. The objection to this operation is that when the nozzle valve is closed, the hose is subjected to the full pressure of the liquid so that if there is any weakness in it, or if the hose be torn away from the stand, the liquid may escape, with serious consequences. A further objection is that when the delivery is completed by closing the nozzle valve and the hose is hung on its hook, it will be left full of liquid and hence remain an extra hazard.

The objections mentioned are overcome in the present invention by starting and stopping the flow at the entry to the hose under control of a push button or other device at the nozzle or delivery end of the hose.

In Figures 1 and 2, the flow of liquid to the delivery hose is shown as controlled by a pressure operated valve consisting of a piston 39 operating in a cylinder 40 and actuating a stem 41 carrying a valve 42 which is normally seated by a spring 43. This valve is interposed in the liquid delivery line at the discharge side of the meter and may be suitably housed in the delivery stand.

For controlling the delivery valve described, a push button 44 is shown located for convenient operation at the nozzle end of the hose, said push button actuating a stem 45 carrying the oppositely facing valve elements 46, 47, the first admitting pressure from an air supply line 48 to an air connection 49 extending back to the cylinder of the delivery valve and the second controlling an exhaust port 50.

A spring 51 is indicated for normally holding supply valve 46 closed and the exhaust valve open. This push button valve may be made as a part of the nozzle structure or be suitably attached thereto and the two air lines 48, 49 leading thereto may be simply small flexible tubing suitably secured to the outside of the hose, as indicated.

In operation, after the nozzle has been removed from the hook and liquid has thereupon been automatically forced from the pressure tank up to the meter and delivery valve, actual delivery of liquid can be effected in any desired quantity by simply actuating the push button valve on the nozzle. It will be seen that when this push button is depressed, air under pressure will be supplied through connections 48, 49 to the piston of the delivery valve and said valve will be thereby opened to deliver metered liquid through the nozzle of the hose.

When the desired quantity is delivered, pressure on the push button is removed, permitting the pressure supply valve 46 to close and the exhaust valve 47 to open. Pressure for actuating the delivery valve is thereby cut off and all pressure on said valve is released back through connection 49 and by way of exhaust valve 47 to atmosphere. The hose can thus be fully drained after each use so that when restored to the hook it will be empty. If anything should happen to break the air connections on the hose, no harm can result, aside from the loss of air, as the liquid delivery valve will simply remain closed.

The structure and method of operation of the delivery valve may vary to suit different requirements.

In Figure 5, the delivery valve is shown as of the electromagnetic type, involving a magnet 52 of the solenoid type having a movable core 53 connected with the valve element 54, said magnet being controlled by a circuit, part of which is indicated at 55, ending in a push button switch 56 conveniently mounted on the nozzle. The electrical energy for this valve may be taken from the lighting circuit usually provided on these delivery stands as by means of a suitable connecting plug such as indicated at 57.

The electromagnetic remote control of the delivery valve possesses the same advantages as the compressed air operation previously described because any breakage in the control connections extending down the hose will do no more than simply leave the delivery valve in its closed condition. It will be understood that this remotely controlled delivery valve which makes it possible to maintain a "dry hose" condition at the delivery stand, may be applied to other forms of delivery systems than the one described. The structure and control of the delivery valve may vary to suit different systems with which it is used and the claims are to be construed accordingly.

What is claimed is:

1. A "dry hose" liquid delivery system comprising, in combination, a liquid supply line, a delivery hose connected with said supply line, a flow meter in the supply line at the entrance to said delivery hose for continuously metering any amounts of liquid discharged from said hose, a normally closed delivery valve in said liquid supply line and directly operable to control admission of liquid from the supply line to said hose and control means at the discharge end of said hose for effecting the opening of said delivery valve and for holding said valve open to discharge in a continuous flow any desired metered quantities of liquid from the hose.

2. A "dry hose" liquid delivery system comprising, in combination, means, including a pipe line for supplying a flow of liquid under pressure, a delivery hose connected to discharge liquid from said supply line, a flow meter connected to continuously measure the discharge of said hose, a delivery valve in said liquid supply line and normally closed to prevent flow from the supply line through the hose, means for holding said valve open to permit the hose to discharge metered quantities of liquid from the supply line and means adjacent the discharge end of the hose for controlling said valve actuating means to uninterruptedly discharge arbitrarily selected quantities of liquid from the hose and to stop the flow into the hose, at any time from a control position at the discharge end of the hose, leaving the hose emptied of liquid.

3. A liquid delivery system, comprising in combination, a liquid supply line, means for furnishing an unlimited continuous supply of liquid under pressure to said supply line, a flexible delivery hose at the end of said supply line, a flow meter in the supply line adjacent said delivery hose for continuously metering any amounts of liquid discharged from said hose, means for effecting flow control of liquid under pressure through said supply line and means at the discharge end of said delivery hose for actuating said control means to effect uninterrupted continuously metered delivery of liquid through the hose in any varying quantities and to determine the metered quantity and stop the flow delivered by the hose at any time entirely from a control position at the discharge end of the hose.

4. A liquid delivery system, comprising in combination, a liquid supply line, means for furnishing an unlimited continuous supply of liquid under pressure to said supply line, a flexible delivery hose at the end of said supply line, a flow meter in the supply line adjacent said delivery hose for continuiusly metering any amounts of liquid discharged from said hose, means for effecting flow control of liquid under pressure through said supply line, means at the discharge end of said delivery hose for actuating said control means to effect uninterrupted continuously metered delivery of liquid through the hose in any varying quantities and to determine the metered quantity and stop the flow delivered by the hose at any time entirely from a control position at the discharge end of the hose, a support for the free end of said hose and means automatically operable on the return of the hose to supported relation on said support for preventing delivery of liquid by the hose under control of said means at the discharge end of the hose.

In testimony whereof, I affix my signature.

JOHN J. HAWXHURST.